(12) United States Patent
Zhu et al.

(10) Patent No.: US 7,153,803 B2
(45) Date of Patent: Dec. 26, 2006

(54) HIGH ACTIVITY AND GOOD HYDROGEN RESPONSE ZIEGLER-NATTA POLYETHYLENE CATALYST

(75) Inventors: Zhidong Zhu, Houston, TX (US); Main Chang, Houston, TX (US); Christopher J. Aarons, Houston, TX (US)

(73) Assignee: Engelhard Corporation, Iselin, NJ (US)

( * ) Notice: Subject to any disclaimer, the term of this patent is extended or adjusted under 35 U.S.C. 154(b) by 248 days.

(21) Appl. No.: 10/879,572

(22) Filed: Jun. 28, 2004

(65) Prior Publication Data

US 2005/0288460 A1    Dec. 29, 2005

(51) Int. Cl.
*C08F 4/02* (2006.01)
*C08F 4/64* (2006.01)
*C08F 5/58* (2006.01)

(52) U.S. Cl. .................. 502/115; 502/116; 502/127; 526/124.8; 526/124.9; 526/125.3; 526/125.6

(58) Field of Classification Search ............. 526/124.8, 526/124.9, 125.3, 125.6; 502/115, 116, 127
See application file for complete search history.

(56) References Cited

U.S. PATENT DOCUMENTS

| | | | |
|---|---|---|---|
| 5,204,303 A | 4/1993 | Korvenoja et al. | |
| 5,247,032 A | 9/1993 | Kioka et al. | |
| 5,346,972 A | 9/1994 | Duranel et al. | |
| 5,374,695 A | 12/1994 | Tanaglia et al. | |
| 5,459,116 A | 10/1995 | Ro et al. | |
| 5,523,358 A | 6/1996 | Hirose et al. | |
| 5,905,050 A | 5/1999 | Koshinen et al. | |
| 5,955,396 A | 9/1999 | Lee et al. | |
| 5,965,478 A | 10/1999 | Goto et al. | |
| 6,054,542 A | 4/2000 | Kojoh et al. | |
| 6,057,407 A | 5/2000 | Lin et al. | |
| 6,136,745 A | 10/2000 | Ashton et al. | |
| 6,187,883 B1 | 2/2001 | Satoh et al. | 526/125.3 |
| 6,232,255 B1 | 5/2001 | Winslow et al. | |
| 6,291,385 B1 | 9/2001 | Lee et al. | |
| 6,323,293 B1 | 11/2001 | Shamshoun | |
| 6,559,249 B1 * | 5/2003 | Yang et al. | 526/124.3 |
| 6,630,544 B1 | 10/2003 | Klendworth et al. | |
| 2002/0082160 A1 | 6/2002 | Yashiki et al. | |
| 2004/0063875 A1 * | 4/2004 | Yang et al. | 526/125.3 |

FOREIGN PATENT DOCUMENTS

| | | |
|---|---|---|
| EP | 0 452 916 A1 | 10/1991 |
| JP | 58042603 A * | 3/1983 |
| JP | 60106806 | 6/1985 |
| JP | 60192708 | 10/1985 |
| WO | WO 02/38619 | 5/2002 |
| WO | WO 02/38620 | 5/2002 |
| WO | WO 02/38623 | 5/2002 |
| WO | WO 02/38624 | 5/2002 |
| WO | WO 03/000746 | 1/2003 |
| WO | WO 03/000747 | 1/2003 |
| WO | WO 03/055922 A1 | 7/2003 |

* cited by examiner

*Primary Examiner*—Caixia Lu
(74) *Attorney, Agent, or Firm*—Russell G. Lindenfeldar

(57) ABSTRACT

Disclosed are catalyst systems and methods of making the catalyst systems/supports for the polymerization of polyethylene containing a solid titanium catalyst component containing a titanium compound and a support made from a magnesium compound, an alkyl silicate, and a monoester. The catalyst system may further contain an organoaluminum compound. Also disclosed are methods of making various types of polyethylene involving polymerizing ethylene in the presence of hydrogen and a catalyst system containing a support made from a magnesium compound, an alkyl silicate and a monoester.

22 Claims, 1 Drawing Sheet

HIGH ACTIVITY AND GOOD HYDROGEN RESPONSE ZIEGLER-NATTA POLYETHYLENE CATALYST

FIELD OF THE INVENTION

The present invention generally relates to ethylene polymerization catalyst systems. In particular, the present invention relates to catalyst supports and catalyst systems for making polyethylene and methods of making the catalyst systems and polyethylene.

BACKGROUND OF THE INVENTION

Polyolefins are a class of polymers derived from simple olefins. Known methods of making polyolefins involve the use of Ziegler-Natta polymerization catalysts. These catalysts polymerize vinyl monomers and/or ethylene using a transition metal halide to provide a polyolefin. Polyethylene is a polyolefin.

Numerous Ziegler-Natta polymerization catalysts exist. The catalysts have different characteristics and/or lead to the production of polyolefins having diverse properties. For example, certain catalysts have high activity while other catalysts have low activity, and similarly certain catalysts have a long life while other catalysts have a short life. Moreover, polyolefins made with the use of Ziegler-Natta polymerization catalysts vary in stereoregularity, molecular weight distribution, impact strength, melt-flowability, rigidity, heat sealability, isotacticity, and the like.

Polyethylene is the most popular plastic in the world. Polyethylene is used to make grocery bags, shampoo bottles, toys, and even body armor. For such a versatile material, it has a very simple structure, the simplest of all commercial polymers. Specifically, a molecule of polyethylene is merely a long chain of carbon atoms, with two hydrogen atoms attached to each carbon atom. Sometimes some of the carbons, instead of having hydrogens attached to them, have long chains of polyethylene attached to them. This type of polymer is labeled branched or low density polyethylene (LDPE). When there is no branching, the polymer is labeled linear polyethylene (HDPE). Linear polyethylene is much generally stronger than branched polyethylene, but branched polyethylene is typically cheaper and easier to make.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides ethylene polymerization catalyst systems, methods of making the ethylene polymerization catalyst systems, and methods of polymerizing (and copolymerizing) ethylene involving the use of a solid titanium catalyst component containing a catalyst support made from a magnesium compound, an alkyl silicate, and a monoester. Use of the alkyl silicate and the monoester provides the solid titanium catalyst component and catalyst support with a substantially uniform and relatively large particle size, with minimal fines.

Use of the alkyl silicate and the monoester also provides the solid titanium catalyst component with increased catalytic activity compared with similar solid titanium catalyst components that are not made with an alkyl silicate and a monoester. Use of the alkyl silicate and the monoester permits the solid titanium catalyst component to use less hydrogen compared with similar solid titanium catalyst components that are not made with an alkyl silicate and a monoester to make polyethylene with desirable melt flow rates and molecular weight. Accordingly, the present invention also provides methods of making polyethylene involving polymerizing ethylene using a solid titanium catalyst component containing a titanium compound and a support made from a magnesium compound, an alkyl silicate, and a monoester.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
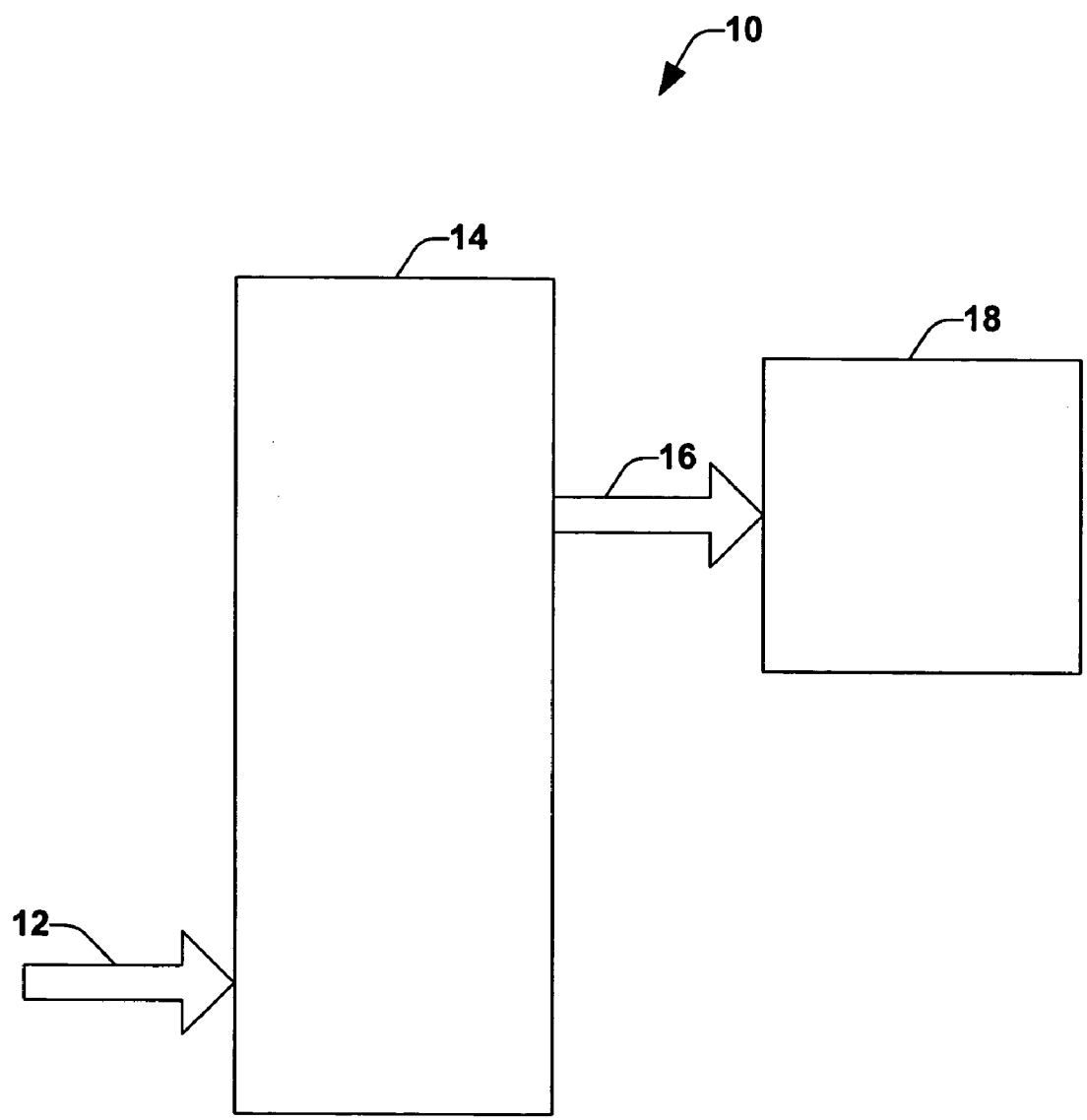
FIG. 1 is a high level schematic diagram of an olefin polymerization system in accordance with one aspect of the present invention.

The present invention relates to catalyst supports, solid titanium catalyst components, catalyst systems, methods of making catalyst supports, solid titanium catalyst components, and catalyst systems, and methods of making polyethylenes including linear polyethylene (HDPE) and linear low density polyethylene (LLDPE).

An aspect of the invention is forming the catalyst support from a magnesium compound, an alkyl silicate, and a monoester. Use of the alkyl silicate and monoester contributes to the ability to form a catalyst support of relatively large size, without the formation of fines, and consequently, a solid titanium catalyst component of relatively large size. In one embodiment, the size (diameter) of catalyst support particles and/or the solid titanium catalyst component formed in accordance with the present invention is from about 5 microns to about 60 microns (on a 50% by volume basis). In another embodiment, the size (diameter) of catalyst support particles and/or the solid titanium catalyst component is from about 10 microns to about 50 microns (on a 50% by volume basis). In yet another embodiment, the size (diameter) of catalyst support particles and/or the solid titanium catalyst component is from about 15 microns to about 45 microns (on a 50% by volume basis).

Both the catalyst support particles and the solid titanium catalyst component particles made in accordance with the present invention have a relatively low amount of fines. Fines are undesirable small particles, typically having a size below 1 micron. In one embodiment, the catalyst support particles and/or the solid titanium catalyst component formed in accordance with the present invention contain about 10% by weight or less fines. In another embodiment, the catalyst support particles and/or the solid titanium catalyst component formed in accordance with the present invention contain about 7% by weight or less fines. In yet another embodiment, the catalyst support particles and/or the solid titanium catalyst component formed in accordance with the present invention contain about 5% by weight or less fines. In still yet another embodiment, the catalyst support particles and/or the solid titanium catalyst component formed in accordance with the present invention contain about 3% by weight or less fines.

There are a number of benefits associated with the relatively large and uniformly sized catalyst supports and solid titanium catalyst components. The use of the alkyl silicate and the monoester also contributes to the ability to form a solid titanium catalyst component with high activity and excellent hydrogen response. The relatively large size of the catalyst support and solid titanium catalyst component contribute to the ability of the catalyst system in various polymerization methods to provide an improved level of control over the properties of the resultant polyethylene product (melt flow rates, glass transition temperature, molecular weight, coefficients of temperature induced expansion/contraction, improved flowability, and the like). Using an alkyl silicate and a monoester to form a solid titanium catalyst component permits one to use gas phase processing to form polyethylene.

When the catalyst support is made using an alkyl silicate and a monoester, a catalyst system is provided that produces polyethylene polymer product having a controlled and/or relatively large size and shape, a controlled molecular weight, and high melt flow rates.

The present invention further relates to a ethylene polymerization catalyst system formed from an organoaluminum compound and a solid titanium catalyst component comprising the catalyst support made from a magnesium compound, an alkyl silicate, and a monoester. The present invention further relates to a polymerization process which comprises polymerizing or copolymerizing polyethylene in the presence of hydrogen and the ethylene polymerization catalyst system described above.

Generally speaking, the magnesium based catalyst support is made by contacting at least one magnesium compound, at least one alkyl silicate, and at least one monoester in an organic medium optionally under elevated temperatures (above room temperature). When the magnesium compound is subsequently reconstituted, recrystallized, and/or recovered, it has a relatively large and uniform particle size. These desirable and beneficial properties are not obtained when the alkyl silicate and monoester are otherwise not employed.

The magnesium compounds used in the preparation of the catalyst support and ultimately the solid titanium catalyst component include, for example, a magnesium compound having reducibility and a magnesium compound having no reducibility. Specific examples of the magnesium compound having no reducibility include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

The magnesium compound having reducibility is, for example, a magnesium compound having a magnesium-carbon bond or a magnesium-hydrogen bond. Specific examples of the magnesium compound having reducibility include dialkyl magnesiums such as dimethyl magnesium, diethyl magnesium, dipropyl magnesium, dibutyl magnesium, ethylbutyl magnesium, diamyl magnesium, dihexyl magnesium and didecyl magnesium; monoalkyl magnesium monohalides such as ethyl magnesium chloride, propyl magnesium chloride, butyl magnesium chloride, hexyl magnesium chloride and amyl magnesium chloride; butylethoxymagnesium; and butyl magnesium halides. These magnesium compounds may be used as such or as a complex with an organoaluminum compound to be described. These magnesium compounds may be in the liquid or solid state.

The magnesium compound having no reducibility may be a compound derived from the magnesium compound having reducibility separately or at the time of preparing the catalyst component. This is effected, for example, by contacting the magnesium compound having reducibility with such a compound as a polysiloxane compound, a halogen-containing silane compound, a halogen-containing aluminum compound, an ester or an alcohol. In addition to the above magnesium compounds having no reducibility, the magnesium compound used in this invention may also be a complex compound or a double compound with another metal or a mixture with another metal compound.

In one aspect of the present invention, the magnesium compounds having no reducibility are preferred. In another aspect of the present invention, halogen-containing magnesium compounds, such as magnesium chloride, alkoxy magnesium chlorides and aryloxy magnesium chlorides, are preferred.

Alkyl silicates and the monoester directly contribute to many of the beneficial properties of the catalyst support and catalyst system. General examples of alkyl silicates include tetraalkylorthosilicates, and the like. Examples of alkyl silicates include tetramethylorthosilicate, tetraethylorthosilicate, tetrapropylorthosilicate, tetrabutylorthosilicate, diethyidimethylorthosilicate, and the like.

Monoesters are organic compounds that contain only one ester group (generally represented as $RCO_2R$), and not two, three, four, or more ester groups, although a monoester may contain other functional groups such as an alcohol group. General examples of organic monoesters include aromatic monoesters, alkyl aromatic monoesters (in one embodiment the alkyl group contains from about 1 to about 10 carbon atoms and the aromatic group contains about 6 to about 25 carbon atoms while in another embodiment the alkyl group contains from about 2 to about 4 carbon atoms and the aromatic group contains about 7 to about 15 carbon atoms), alkyl benzoates, and the like.

Monoesters are typically represented by RCOOR' where R and R' are hydrocarboyl groups that may have a substituent, and at least one of them is a branched (including alicyclic) or ring-containing aliphatic group. Specifically, at least one of R and R' may be $(CH_3)_2CH-$, $C_2H_5CH(CH_3)-$, $(CH_3)_2CHCH_2-$, $(CH_3)_3C-$, $C_2H_5CH-$, $(CH_3)CH_2-$, cyclohexyl, methylbenzyl, para-xylyl, acrylic, and carbonylbenzyl. If either one of R and R' is any of the above-described group, the other may be the above group or another group such as a linear or cyclic group. Examples of the monoesters include esters of benzoic acid, substituted benzoic acids, dimethylacetic acid, trimethylacetic acid, alpha-methylbutyric acid, beta-methylbutyric acid, methacrylic acid and benzoylacetic acid; and monoesters formed with alcohols such as methanol, ethanol, isopropanol, isobutanol and tert-butanol.

Specific examples of monoesters include organic acid esters having 2 to about 30 carbon atoms such as methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methylbenzoate, ethyl p-t-butylbenzoate, ethyl naphthoate, methyl toluate, ethyl toluate, amyl toluate, ethyl ethylbenzoate, methyl anisate, ethyl anisate, and ethyl ethoxybenzoate.

The organic medium in which the magnesium compound, alkyl silicate, and monoester are contacted include one or more organic solvents and/or organic liquids. Preferably the organic solvent is capable of at least partially dissolving the magnesium compound. Examples of organic solvents include oxygen containing compounds such as alcohols and glycols, ketones, ethers, and the like. Examples of alcohols include methanol, ethanol, propanol, butanol, pentanol, hexanol, cyclohexanol, and the like. The magnesium compound, alkyl silicate, monoester, and organic medium can be combined in any order (all four at once; the magnesium compound and the organic medium initially combined, followed by addition of the alkyl silicate and monoester; or the alkyl silicate, monoester, and the organic medium initially combined, followed by addition of the magnesium compound).

The mixture of the magnesium compound, alkyl silicate, monoester, and organic medium is optionally heated above room temperature for a suitable amount of time. In one embodiment, the mixture is heated to a temperature from about 30° C. to about 200° C. for a period of time from about 5 minutes to about 15 hours. In another embodiment, the mixture is heated to a temperature from about 40° C. to about 175° C. for a period of time from about 10 minutes to about 10 hours.

A suitable amount of organic medium is employed to at partially dissolve the magnesium compound. In one embodiment, the ratio of organic medium to magnesium compound is from about 1:1 to about 25:1. In another embodiment, the ratio of organic medium to magnesium compound is from about 2:1 to about 20:1. In yet another embodiment, the ratio of organic medium to magnesium compound is from about 1:3 to about 10:1.

In one embodiment, however, the magnesium based catalyst support is not formed using spray drying. In another embodiment, the magnesium based catalyst support is not dealcoholed. In yet another embodiment, the magnesium based catalyst support does not comprise silica and/or silicon. In one embodiment, while the alkyl silicate is necessary to form the magnesium based catalyst support, the magnesium based catalyst support does not contain notable amounts of the alkyl silicate (less than about 2% by weight, and even less than about 1% by weight).

The solid titanium catalyst component used in this invention is a highly active catalyst component comprising at least titanium and a magnesium containing catalyst support made with an alkyl silicate and a monoester. In one embodiment, a solid titanium catalyst component containing magnesium, titanium, halogen and an internal electron donor is employed because activity is sometimes increased and it produces a polymer with good hydrogen response.

The solid titanium catalyst component may be prepared by contacting a catalyst support made with an alkyl silicate and monoester, as described above, and a titanium compound. The titanium compound used in the preparation of the solid titanium catalyst component in the present invention is, for example, a tetravalent titanium compound represented by Formula (I)

$$\text{Ti(OR)}_g X_{4-g} \qquad (I)$$

wherein R represents a hydrocarbon group, preferably an alkyl group having 1 to about 4 carbon atoms, X represents a halogen atom, and $0 \leq g \leq 4$. Specific examples of the titanium compound include titanium tetrahalides such as $\text{TiCl}_4$, $\text{TiBr}_4$ and $\text{TiI}_4$; alkoxytitanium trihalides such as $\text{Ti(OCH}_3)\text{Cl}_3$, $\text{Ti(OC}_2\text{H}_5)\text{Cl}_3$, $\text{Ti(O n-C}_4\text{H}_9)\text{Cl}_3$, $\text{Ti(OC}_2\text{H}_5)\text{Br}_3$ and $\text{Ti(O iso-C}_4\text{H}_9)\text{Br}_3$; dialkoxytitanium dihalides such as $\text{Ti(OCH}_3)_2\text{Cl}_2$, $\text{Ti(OC}_2\text{H}_5)_2\text{Cl}_2$, $\text{Ti(O n-C}_4\text{H}_9)_2\text{Cl}_2$ and $\text{Ti(OC}_2\text{H}_5)_2\text{Br}_2$; trialkoxytitanium monohalides such as $\text{Ti(OCH}_3)_3\text{Cl}$, $\text{Ti(OC}_2\text{H}_5)_3\text{Cl}$, $\text{Ti(O n-C}_4\text{H}_9)_3\text{Cl}$ and $\text{Ti(OC}_2\text{H}_5)_3\text{Br}$; and tetraalkoxytitaniums such as $\text{Ti(OCH}_3)_4$, $\text{Ti(OC}_2\text{H}_5)_4$ and $\text{Ti(O n-C}_4\text{H}_9)_4$. These titanium compounds may be used individually or in a combination of two or more. They may be used as dilutions in hydrocarbon compounds or halogenated hydrocarbons.

In one embodiment in the preparation of the solid titanium catalyst component, an internal electron donor is not used. In another embodiment in the preparation of the solid titanium catalyst component, an internal electron donor, for example, oxygen-containing electron donors such as alcohols, certain organosilicon compounds, polysiloxanes including polydimethylsiloxanes such as hexamethyldisiloxane, phenols, ketones, aldehydes, carboxylic acids, inorganic acid esters, polycarboxylic acid esters, ethers, acid amides and acid anhydrides, and nitrogen-containing electron donors such as ammonia, amines, nitriles and isocyanates are used. Specific examples include alcohols having 1 to about 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isopiropylbenzyl alcohol; phenols having 6 to about 25 carbon atoms such as phenol, resol, xylenol, ethylphenol, propylphenol, cumylphenol, nonylphenol and naphthol; ketones having about 3 to about 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; polycarboxylic acid esters polyethyl acetate, polyvinyl acetate, dibutyl maleate, diethyl butylmalonate, diethyl dibutylmalonate, diethyl 1,2-cyclohexanedicarboxylate, di-2-ethylhexyl 1,2-cyclohexanedicarboxylate, dimethyl phthalate, diethyl phthalate, dibutyl phthalate, dioctyl phthalate; inorganic acid esters such as ethyl silicate, butyl silicate, vinyltriethoxysilane, phenyltriethoxysilane and diphenyldiethoxysilane; acid halides having 2 to about 15 carbon atoms such as acetyl chloride, benzoyl chloride, tolyl chloride, anisoyl chloride and phthaloyl dichloride; ethers having 2 to about 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

An organosilicon compound represented by Formula (II)

$$R_nSi(OR')_{4-n} \quad (II)$$

wherein R and R' represent a hydrocarbon group, and n is 0≦n≦4. may also be used as the internal electron donor. Specific examples of the organosilicon compound of Formula (II) include trimethylmethoxysilane, trimethylethoxysilane, dimethyldimethoxysilane, dimethyldiethoxysilane, diisopropyidimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyidimethoxysilane, bis-m-tolyidimethoxysilane, bis-p-tolyldimethoxysilane, bis-p-totyidiethoxysilane, bisethylphenyidimethoxysilane, dicyclohexyldimethoxysilane, cyclohexylmethyidimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

Polycarboxylic acid esters may also be employed as internal electron donors for use with the titanium catalyst component. Further examples of these polycarboxylic acid esters are compounds represented by the following formulae

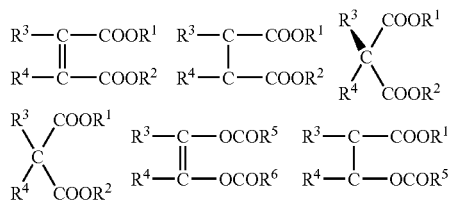

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, at least one of them is preferably a substituted or unsubstituted hydrocarbon group, and $R^3$ and $R^4$ may be linked to each other. In one embodiment, the substituted or unsubstituted hydrocarbon groups contain from 1 to about 30 carbon atoms. Examples of the substituted hydrocarbon groups for $R^1$ through $R^5$ are hydrocarbon groups having groups containing hetero atoms such as N, O and S, for example, C—O—C, COOR, COOH, OH, $SO_3H$, —C—N—C— and $NH_2$.

Additional specific examples of polycarboxylic acid esters include aliphatic polycarboxylic acid esters such as diethyl succinate, dibutyl succinate, diethyl methylsuccinate, diisobutyl alpha-methylglutarate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethlisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate; and heterocyclic polycarboxylic acid esters such as 3,4-furanedicarboxylic acid esters. Specific examples of the polyhydroxy compound esters may include 1,2-diacetoxybenzene, 1-methyl-2,3-diacetoxybenzene, 2-methyl-2,3-diacetoxybenzene, 2,8-diacetoxynaphthalene, ethylene glycol dipivalate and butanediol pivalate. Specific examples of the hydroxy-substituted carboxylic acid esters are benzoylethyl salicylate, acetylisobutyl salicylate and acetylmethyl salicylate. Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component.

The optional internal electron donors may be used individually or in combination. In employing the internal electron donor, they do not have to be used directly as starting materials, but compounds convertible to the electron donors in the course of preparing the titanum catalyst components may also be used as the starting materials.

The solid titanium catalyst component may be formed by contacting the magnesium containing catalyst support and the titanium compound and optionally, the internal electron donor by known methods used to prepare a highly active titanium catalyst component from a magnesium support, a titanium compound and optionally an electron donor.

Several examples of the method of producing the solid titanium catalyst component are briefly described below.

(1) The magnesium based catalytic support optionally with the internal electron donor, is reacted with the titanium compound in the liquid phase. This reaction may be carried out in the presence of a pulverizing agent. Compounds which are solid may be pulverized before the reaction.

(2) The magnesium based catalytic support having no reducibility and the titanium compounds are reacted in the presence of the optional internal electron donor to precipitate a solid titanium complex.

(3) The reaction product obtained in (2) is further reacted with the titanium compound.

(4) The reaction product obtained in (1) or (2) is further reacted with the internal electron donor and the titanium compound.

(5) The magnesium based catalytic support and the optional internal electron donor is pulverized in the presence of the titanium compound, and the resulting solid product is treated with a halogen, a halogen compound or an aromatic hydrocarbon. In this method, the magnesium based catalytic support with the electron donor may be pulverized in the presence of a pulverizing agent, etc. Alternatively, the magnesium based catalytic support and the optional internal electron donor is pulverized in the presence of the titanium compound, preliminarily treated with a reaction aid and thereafter, treated with halogen, etc. The reaction aid may be an organoaluminum compound or a halogen-containing silicon compound.

(6) The product obtained in (1) to (4) is treated with a halogen, a halogen compound or an aromatic hydrocarbon.

(7) A magnesium based catalytic support is reacted with the optional internal electron donor, the titanium compound and/or a halogen-containing hydrocarbon.

In embodiments of making the solid titanium catalyst component according to examples (2), (3), (4) and (6), the magnesium based catalytic support solution is mixed with liquid titanium tetrahalide to form a solid precipitate in the presence of an auxiliary precipitant. A polycarboxylic acid ester may be added before, during or after the precipitation of the solids and loaded on the solid.

The process of solids precipitation can be carried out by at least one of two methods. One method involves mixing liquid titanium tetrahalide with magnesium based catalytic support at a temperature in the range of about −40° C. to about 0° C., and precipitating the solids while the temperature is raised slowly to a range from about 30° C. to about 120° C., such as from about 60° C. to about 100° C. The other method involves adding liquid titanium tetrahalide dropwise into a magnesium based catalytic support solution at low or room temperature to precipitate out solids immediately. The optional internal electron donor can be added either after the magnesium based catalytic support solution is obtained or together with magnesium based catalytic support. Alternatively, two or more auxiliary precipitants can be added simultaneously.

Optionally, the solids are treated by adding an alkane or a polycarboxylic acid ester into the system after the precipitation process. Alternatively, an alkane or a polycarboxylic acid ester can be added during the precipitation process. A mixture of two or more alkanes/polycarboxylic acid esters can be used.

To facilitate obtaining uniformly sized solid particles, the process of precipitation can be carried out slowly. When the second method of adding titanium halide dropwise at low or room temperature is applied, the process may take place over a period from about 1 hour to about 6 hours. When the first method of raising the temperature in a slow manner is applied, the rate of temperature increase can range from about 4° C. to about 100° C. per hour.

The solid precipitate is first separated from the mixture. In the solid precipitate thus obtained may be entrained a variety of complexes and impurities, so that further treatment may in some instances be necessary.

The solid precipitate is washed with an inert diluent and then treated with titanium tetrahalide or a mixture of titanium tetrahalide and an inert diluent. The titanium tetrahalide used in this act is identical to or different with the titanium tetrahalide used in the second act. The amount of titanium tetrahalide used is from about 1 to about 20 moles, such as from about 2 to about 15 moles, per mole of magnesium halide in the support. The treatment temperature ranges from about 50° C. to about 150° C., such as from about 60° C. to about 100° C. If a mixture of titanium tetrahalide and inert diluent is used to treat the solid precipitate, the volume % of titanium tetrahalide in the treating solution is from about 10% to about 100%, the rest being an inert diluent.

The treated solids can optionally be further washed with an inert diluent to remove ineffective titanium compounds and other impurities. The inert diluent herein used can be hexane, heptane, octane, 1,2-dichloroethane, benzene, toluene and other hydrocarbons.

In one embodiment, particularly embodiments following example (2) described above, the solid catalyst component has the following chemical composition: titanium, from about 1.5 to about 6.0 wt %; magnesium, from about 10 to about 20 wt %; halogen, from about 40 to about 70 wt %; optionally polycarboxylic acid ester, from about 5 to about 25 wt %; and optionally inert diluent from about 0 to about 15 wt %.

The amounts of the ingredients used in preparing the solid titanium catalyst component may vary depending upon the method of preparation. In one embodiment, from about 0 to about 5 moles of the internal electron donor and from about 0.01 to about 500 moles of the titanium compound are used per mole of the magnesium compound used to make the solid titanium catalyst component. In another embodiment, from about 0.05 to about 2 moles of the internal electron donor and from about 0.05 to about 300 moles of the titanium compound are used per mole of the magnesium compound used to make the solid titanium catalyst component.

In one embodiment, in the solid titanium catalyst component, the atomic ratio of halogen/titanium is from about 4 to about 200 and the magnesium/titanium atomic ratio is from about 1 to about 100. In another embodiment, in the solid titanium catalyst component, the atomic ratio of halogen/titanium is from about 5 to about 100 and the magnesium/titanium atomic ratio is from about 2 to about 50.

The resulting solid titanium catalyst component generally contains a magnesium halide of a smaller crystal size than commercial magnesium halides and usually has a specific surface area of at least about 50 m$^2$/g, such as from about 60 to 1,000 m$^2$/g, or from about 100 to 800 m$^2$/g. Since, the above ingredients are unified to form an integral structure of the solid titanium catalyst component, the composition of the solid titanium catalyst component does not substantially change by washing with hexane.

The solid titanium catalyst component may be used alone. If desired, it can be used after being diluted with an inorganic or organic compound such as a an aluminum compound or a polyolefin. In some instances when such a diluent is used, the catalyst component may show high catalytic activity even when it has a lower specific surface than that described above.

Methods of preparing the active catalyst component, which can be used in the present invention so long as the catalyst support made with an alkyl silicate and a monoester is used, are described in U.S. Pat. Nos. 4,771,023; 4,784,983; 4,829,038; 4,861,847; 4,990,479; 5,177,043; 5,194,531; 5,244,989; 5,438,110; 5,489,634; 5,576,259; 5,773,537; 6,057,407; 6,136,745; 6,232,255; 6,291,385; and 6,323,293, which are hereby incorporated by reference in this regard.

The catalyst system may contain at least one organoaluminum compound in addition to the solid titanium catalyst component. Compounds having at least one aluminum-carbon bond in the molecule can be used as the organoaluminum compound. Examples of organoaluminum compounds include compounds of the following Formulae (III) and (IV).

$$R_m^{11}Al(OR^{12})_nH_pX_q^1 \qquad (III)$$

In Formula (III), $R^{11}$ and $R^{12}$ may be identical or different, and each represent a hydrocarbon group usually having 1 to about 15 carbon atoms, preferably 1 to about 4 carbon atoms; $X^1$ represents a halogen atom, 0<3, 0≦p<3, 0≦n<3, and m+n+p+q=3.

Organoaluminum compounds further include complex alkylated compounds between aluminum and a metal of Group I represented by Formula (IV)

$$M^1AlR_4^{11} \quad (IV)$$

wherein $M^1$ represents Li, Na or K, and $R^{11}$ is as defined above.

Examples of the organoaluminum compounds Formula (III) are as follows:

compounds of the general formula $R_m^{11}Al(OR^{12})_3$-m wherein $R^{11}$ and $R^{12}$ are as defined, and m is preferably a number represented by 1.5≦m≦3;

compounds of the general formula $R_m^{11}AlX_3$-$m^1$ wherein $R^{11}$ is as defined, $X^1$ is halogen, and m is preferably a number represented by 0<M<3;

compounds of the general formula $R_m^{11}AlH_3$-m wherein $R^{11}$ is as defined above, and m is preferably a number represented by 2≦m<3; and compounds represented by the general formula $R^{m11}Al(OR^{12})_nX_q^1$ wherein $R^{11}$ and $R^{12}$ are as defined, $X^1$ is halogen, 0<3, 0≦n<3, m+n+q="3."

Specific examples of the organoaluminum compounds represented by Formula (III) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^{11}Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds further include those similar to Formula (III) such as in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$,

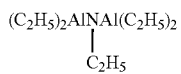

and methylaluminoxane. Examples of organoaluminum compounds represented by Formula (IV) include LiAl$(C_2H_5)_4$ and LiAl$(C_7H_{15})_4$.

The organoaluminum compound catalyst component is used in the catalyst system of the present invention in an amount that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

In one embodiment, the catalyst system containing the solid titanium catalyst component and the organoaluminum compound catalyst component does not contain an external electron donor. In another embodiment, polymerization of ethylene is carried out in the absence of an external electron donor.

Polymerization of ethylene in accordance with the present invention is carried out in the presence of the catalyst system described above in any suitable process. Generally speaking, ethylene is contacted with the catalyst system described above under suitable conditions, typically in the presence of hydrogen, to form desired polyethylene products.

In polymerization, the solid titanium catalyst component is usually employed in combination with at least a portion of the organoaluminum compound. In one embodiment, the polymerization is carried out by adding ethylene and the above catalyst system ingredients to an inert hydrocarbon medium and reacting the ethylene under mild conditions.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the present invention, a liquid olefin may be used in place of part or the whole of the inert hydrocarbon medium.

In the process of the present invention, the polymerization of ethylene is carried out usually in the gaseous phase, suspension phase, or liquid phase. In one embodiment, when the polymerization is carried out in a slurry reaction mode, the aforesaid inert hydrocarbon may be used as a reaction solvent. In another embodiment, polyethylene which is liquid at the reaction temperature may alternatively be used as the reaction solvent. In yet another embodiment, an inert hydrocarbon and ethylene which is liquid at the reaction temperature may be employed as the reaction solvent.

In one embodiment, the ethylene polymerization is desirably carried out so that from about 0.1 g to about 1,000 g of polyethylene forms per gram of the titanium catalyst component of the catalyst system. In another embodiment, the polymerization is desirably carried out so that from about 0.3 g to about 500 g of polyethylene forms per gram of the titanium catalyst component. The polymerization may be carried out batchwise or continuously.

In one embodiment, polymerization of the present invention employs a catalyst system containing the titanium catalyst component in an amount from about 0.001 to about 0.75 millimole calculated as Ti atom per liter of the volume of the polymerization zone, the organoaluminum compound in an amount from about 1 to about 2,000 moles per mole of titanium atoms in the titanium catalyst component. In another embodiment, polymerization employs a catalyst system containing the titanium catalyst component in an amount from about 0.005 to about 0.5 millimole calculated as Ti atom per liter of the volume of the polymerization zone, the organoaluminum compound in an amount from about 5 to about 500 moles per mole of titanium atoms in the titanium catalyst component.

The use of hydrogen at the time of polymerization promotes and contributes to control of the molecular weight of the resulting polymer, and the polymer obtained may have a higher and/or controllable melt flow rate. In this case, the activity of the catalyst system is not decreased according to the methods of the present invention.

In one embodiment, the polymerization temperature of the present invention is from about 0° C. to about 200° C. In another embodiment, the polymerization temperature of the present invention is from about 20° C. to about 180° C. In one embodiment, the polymerization pressure is typically from about atmospheric pressure to about 100 kg/cm². In another embodiment, the polymerization pressure is typically from about 2 kg/cm² to about 50 kg/cm². The polymerization may be carried out batchwise, semi-continuously or continuously. The polymerization may also be carried out in two or more stages under different reaction conditions.

The polyethylene so obtained may be a homopolymer, a random copolymer, or a block copolymer. The polyethylene obtained by the process of the present invention is excellent in particle size distribution, particle diameter and bulk density, and the polyethylene obtained has a narrow composition distribution.

The polyethylene obtained by using the catalyst system of the present invention has a very small amount of an amorphous polymer component and therefore a small amount of a hydrocarbon-soluble component. Accordingly, a film molded from this resultant polymer has low surface tackiness.

In one embodiment, the catalyst efficiency (measured as kilogram of polymer produced per gram of catalyst) of the catalyst system of the present invention is at least about 30. In another embodiment, the catalyst efficiency of the catalyst system of the present invention is at least about 35. In yet another embodiment, the catalyst efficiency of the catalyst system of the present invention is at least about 40.

The catalysts/methods of the present invention can in some instances lead to the production of polyethylene having melt flow indexes (MFI) from about 3 to about 9. For example, in one embodiment, a polyethylene product has an MFI from about 4 to about 8. In another embodiment, a polyethylene product has an MFI from about 5 to about 7. The MFI (flow rate) is measured according to ASTM standard D 1238.

The catalysts/methods of the present invention lead to the production of polyethylenes having a relatively narrow molecular weight distribution. In one embodiment, the Mw/Mn of a polyethylene polymer made with a catalyst system containing a catalyst support made using an alkyl silicate and a monoester is from about 2 to about 15. In another embodiment, the Mw/Mn of a polyethylene polymer made with a catalyst system containing a catalyst support made using an alkyl silicate and monoester is from about 3 to about 10.

According to this invention, a polyethylene polymer can be obtained in a large amount and a high yield while the amount of a by-product hydrocarbon-soluble copolymer can be reduced. Since the amount of the polymer yielded per unit amount of titanium is large, an operation of removing the catalyst after the polymerization can be omitted.

The present invention can produce polyethylenes having one or more of excellent melt-flowability, moldability, good hydrogen response, good control over size, shape, size distribution, and molecular weight distribution, and/or good operability. Employing the catalyst systems containing a catalyst support made using an alkyl silicate and monoester according to the present invention yields catalysts simultaneously having high catalytic efficiency and one or more of good hydrogen response, uniform size, large size, and low fines content.

Examples of systems for polymerizing olefins are now described. Referring to FIG. 1, a high level schematic diagram of a system 10 for polymerizing ethylene is shown. Inlet 12 is used to introduce into a reactor 14 catalyst system components, ethylene, hydrogen gas, fluid media, pH adjusters, surfactants, and any other additives. Although only one inlet is shown, many often are employed. Reactor 14 is any suitable vehicle that can polymerize ethylene. Examples of reactors 14 include a single reactor, a series of two or more reactors, slurry reactors, fixed bed reactors, gas phase reactors, fluidized gas reactors, stirred bed reactors, loop reactors, multizone circulating reactors, and the like. Once polymerization is complete, or as polyethylene is produced, the polymer product is removed from the reactor 14 via outlet 16 which leads to a collector 18. Collector 18 may include downstream processing, such as heating, extrusion, molding, and the like.

Although not shown in FIG. 1, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process and/or the systems involved in the polymerization process.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

COMPARATIVE EXAMPLE 1

12 g Magnesium chloride, 50 g 2-ethylhexanol, 0.43 g aluminum isopropoxide, 2.5 ml hexamethyldisiloxane, and 200 ml hexane are charged to a reactor. The reactor temperature is raised to 120° C. and held there for 1.5 hours where the magnesium chloride completely dissolves. After cooling the reactor to −25° C., 150 ml of TiCl₄ is added over 2 hours. The reactor is warmed to −15° C., 20° C., and 90° C., and held at each temperature for 15, 20, and 60 minutes, respectively. After filtration, a mixture of 60 ml of TiCl₄ and 60 ml of hexane is added to the reactor, and the reactor temperature is raised and maintained at 90° C. for one hour. The reactor contents are filtered, washed with 360 ml hexane 4 times, and dried under nitrogen to provide a catalyst.

1500 ml of hexane is charged to a one gallon reactor at 50° C. 0.23 ml of 25% triethyl aluminum and 10 mg of the catalyst in a mineral oil slurry are charged to the reactor. The temperature is raised to 70° C. and 46 lbs. of hydrogen gas are charged to the reactor. Ethylene is added continuously to achieve an overall pressure of 116 lbs. at 75° C. Polymerization is performed for 2 hours at 80° C. The ethylene feed is stopped, the reactor cooled, and polyethylene is separated and dried under vacuum.

EXAMPLE 1

Comparative Example 1 is repeated but after magnesium chloride dissolves and cools down to room temperature, 2.1 ml ethylbenzoate and 6.5 ml tetraethylorthosilicate (TEOS) are added to the reactor.

EXAMPLE 2

Example 1 is repeated but the first addition of $TiCl_4$ is added at 0° C.

EXAMPLE 3

Example 2 is repeated but 150 ml of hexane are used instead of 200 ml.

EXAMPLE 4

Example 1 is repeated but 2.1 ml ethylbenzoate and 6.5 ml TEOS are added to the reactor at 20° C. after the first $TiCl_4$ addition.

EXAMPLE 5

Example 1 is repeated but 2.1 ml ethylbenzoate is added to the reactor at 20° C. after the first $TiCl_4$ addition.

EXAMPLE 6

Example 1 is repeated but all materials are scaled up 1268 times.

Certain aspects of the catalysts and polymerization are described in Table 1. D50 refers to an average diameter in microns of particles of either the catalyst or the resultant polyethylene on a 50% by volume basis as determined by a Malvern Instrument. MI is melt flow index measured by g/10 min according to ASTM standard D 1238. CE is catalytic efficiency measured by kg of polyethylene per g of catalyst. Fines % is the % by weight of fines of the catalyst (the lower the % the more desirable the catalyst).

TABLE 1

| Example | D50 (cat) | % fines | D50 (PE) | CE | MI |
|---|---|---|---|---|---|
| CE1 | 8 | 8.1 | 297.8 | 29.8 | 0.9 |
| E1 | 26.4 | 3.1 | 984.4 | 41.6 | 3.5 |
| E2 | 12.4 | 2.9 | 490.4 | 54.6 | 1.5 |
| E3 | 11.1 | 1.4 | 498.4 | 42.4 | 1.9 |
| E4 | 11.8 | 0.5 | 476.1 | 26.6 | 1.2 |
| E5 | 14.6 | 4.4 | 485.2 | 42.3 | 1.4 |
| E6 | 15.8 | 0.9 | 644.9 | 37.2 | 2.1 |

The average diameter of particles of both the catalyst and the resultant polyethylene are larger when the catalyst support is made with an alkyl silicate and monoester compared to an instance when an alkyl silicate and monoester are not used to make the catalyst support. Melt flow index of the resultant polyethylene is generally higher when the catalyst support is made with an alkyl silicate and monoester compared to an instance when an alkyl silicate and monoester are not used to make the catalyst support. Catalytic efficiency is improved for the catalyst made from a catalyst support made with an alkyl silicate and monoester compared to an instance when an alkyl silicate and monoester are not used to make the catalyst support. The % by weight of fines of the catalyst are notably lower when the catalyst is made from a catalyst support made with an alkyl silicate and monoester compared to an instance when an alkyl silicate and monoester are not used to make the catalyst support.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of making a catalyst support for a catalyst system used for the production of polyethylene, comprising:
    contacting a magnesium compound, an alkyl silicate, and a monoester in a liquid medium to form a mixture, wherein the monoester is selected from the group consisting of methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methylbenzoate, ethyl p-t-butylbenzoate, ethyl naphthoate, methyl toluate, ethyl toluate, amyl toluate, ethyl ethylbenzoate, methyl anisate, ethyl anisate, and ethyl ethoxybenzoate; and
    heating the mixture to form a catalyst support having a diameter from about 5 microns to about 60 microns (on a 50% by volume basis).

2. The method of claim 1, wherein the liquid medium comprises an alcohol.

3. The method of claim 1, wherein the mixture is heated for a time from about 5 minutes to about 15 hours.

4. The method of claim 1, wherein the mixture is heated to a temperature from about 40° C. to about 200° C.

5. The method of claim 1, wherein the catalyst support has a diameter from about 10 microns to about 50 microns (on a 50% by volume basis).

6. The method of claim 1, wherein the alkyl silicate comprises tetracihylorthosilicate and the monoester comprises an alkyl benzoate.

7. The method of claim 1, wherein the magnesium compound is selected from the group consisting of magnesium halides, alkoxy magnesium halides, aryloxy magnesium halides, alkoxy magnesiums, aryloxy magnesiums, and carboxylic acid salts of magnesium.

8. The method of claim 1, wherein the monoester comprises at least one alkyl aromatic monoester.

9. The method of claim 1, wherein the alkyl silicate comprises at least one selected from the group consisting of tetramethylorthosilicate, tetraethylorthosilicate, tetrapropylorthosilicate, tetrabutylorthosllicate, and diethyldimethylorthosilicate.

10. The method of claim 1 further comprising contacting an internal electron donor with the mixture.

11. The method of claim 1, wherein the catalyst support has a diameter from about 15 microns to about 45 microns (on a 50% by volume basis).

12. The method of claim 1, wherein the mixture is heated to a temperature from about 40° C. to about 175° C. for a time from about 10 minutes to about 10 hours.

13. The method of claim 1, wherein the mixture is heated to form the catalyst support so that the catalyst support comprises about 10% by weight or less of particles having a size below 1 micron.

14. The method of claim 1, wherein the mixture is heated to form the catalyst support so that the catalyst support comprises about 7% by weight or less of particles having a size below 1 micron.

15. The method of claim 1, wherein the mixture is heated to form the catalyst support so that the catalyst support comprises about 5% by weight or less of particles having a size below 1 micron.

16. A method of making a catalyst support for a catalyst system used for the production of polyethylene, comprising:

contacting a magnesium compound, an alkyl silicate, and a monoester in a liquid medium to form a mixture, wherein the monoester is selected from the group consisting of methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methylbenzoate, ethyl p-t-butylbenzoate, ethyl naphthoate, methyl toluate, ethyl toluate, amyl toluate, ethyl ethylbenzoate, methyl anisate, ethyl anisate, and ethyl ethoxybenzoate;

heating the mixture to form a catalyst support; and stopping the heating when the catalyst support has a diameter from about 5 microns to about 60 microns (on a 50% by volume basis).

17. The method of claim 16, wherein stopping the heating when the catalyst support has a diameter from about 10 microns to about 50 microns (on a 50% by volume basis).

18. The method of claim 16, wherein stopping the heating when the catalyst support has a diameter from about 15 microns to about 45 microns (on a 50% by volume basis).

19. A method of making a catalyst support for a catalyst system used for the production of polyethylene, comprising:

contacting a magnesium compound, an alkyl silicate, and a monoester in a liquid medium to form a mixture, wherein the monoester is selected from the group consisting of methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methylbenzoate, ethyl p-t-butylbenzoate, ethyl naphthoate, methyl toluate, ethyl toluate, amyl toluate, ethyl ethylbenzoate, methyl anisate, ethyl anisate, and ethyl ethoxybenzoate;

heating the mixture to form a catalyst support; and stopping the heating when the catalyst support comprises about 10% by weight or less of particles having a size below 1 micron.

20. The method of claim 19, wherein stopping the heating when the catalyst support comprises about 7% by weight or less of particles having a size below 1 micron.

21. The method of claim 19, wherein stopping the heating when the catalyst support comprises about 5% by weight or less of particles having a size below 1 micron.

22. The method of claim 19, wherein stopping the heating when the catalyst support compilses about 3% by weight or less of particles having a size below 1 micron.

* * * * *